United States Patent [19]

Iwai

[11] 4,303,874

[45] Dec. 1, 1981

[54] MOTOR SPEED CONTROL SYSTEM

[75] Inventor: Ryuichiro Iwai, Osaka, Japan

[73] Assignee: Matsushita Electric Industrial Co., Ltd., Osaka, Japan

[21] Appl. No.: 164,271

[22] Filed: Jun. 30, 1980

[30] Foreign Application Priority Data

Jul. 13, 1979 [JP] Japan ................................ 54-89530
Oct. 23, 1979 [JP] Japan ................................ 54-137473

[51] Int. Cl.$^{3}$ ................................ H02P 5/16
[52] U.S. Cl. ................................ 318/331; 318/345 CA
[58] Field of Search ................................ 318/331, 345 CA, 459

[56] References Cited

U.S. PATENT DOCUMENTS

| | | | |
|---|---|---|---|
| 3,373,331 | 3/1968 | Dow | 318/345 CA |
| 3,488,756 | 1/1970 | Skrivanek, Jr. | 318/331 |
| 3,621,355 | 11/1971 | Dinger | 318/345 CA |
| 3,697,844 | 10/1972 | Dinger | 318/331 |
| 3,781,620 | 12/1973 | Toth | 318/345 CA |

*Primary Examiner*—David Smith, Jr.

*Attorney, Agent, or Firm*—Stevens, Davis, Miller & Mosher

[57] ABSTRACT

Disclosed is a motor speed control system, in which a detected induced voltage of a motor under speed control is compared with a velocity reference signal which is a sawtooth wave voltage synchronized with a power supply frequency. The motor speed control system comprises a control circuit having a thyristor for controlling the energization of the motor, a sawtooth wave generator circuit for generating the sawtooth wave voltage, an induced voltage detection circuit for detecting the induced voltage due to the rotation of the motor and storing the detected induced voltage in a capacitor, a limiter circuit for limiting a charge voltage of the capacitor, a comparator circuit for comparing the detection signal from the induced voltage detection circuit with the sawtooth wave from the sawtooth wave generator circuit, and a pulse generator circuit for generating a trigger pulse for the thyristor. The motor speed control system reduces the operation noise of the motor, reduces the variation of the motor speed and shortens the response time.

3 Claims, 5 Drawing Figures a
b
c
I
N
Vs
Vc
t 51
53
54
55
56
57
58
59
60
61
62
52
63
64

MOTOR SPEED CONTROL SYSTEM

BACKGROUND OF THE INVENTION

The present invention relates to a motor speed control system wherein a detected induced voltage of a D.C. motor under speed control is compared with a velocity reference signal which is a sawtooth wave voltage synchronized with a power supply input voltage frequency.

SUMMARY OF THE INVENTION

It is an object of the present invention to provide a motor speed control system which generates small operation noise due to a driving power supply which uses a full-wave phase control circuit.

It is another object of the present invention to provide a motor control system which exhibits small velocity variation as a result of the variation of power supply voltage and frequency.

It is another object of the present invention to provide a motor speed control system having a fast response time.

BRIEF DESCRIPTION OF THE DRAWINGS

The preferred embodiments of the present invention will be explained below in conjunction with the accompanying drawings, in which.

DESCRIPTION OF THE PREFERRED EMBODIMENTS

Figure 1:
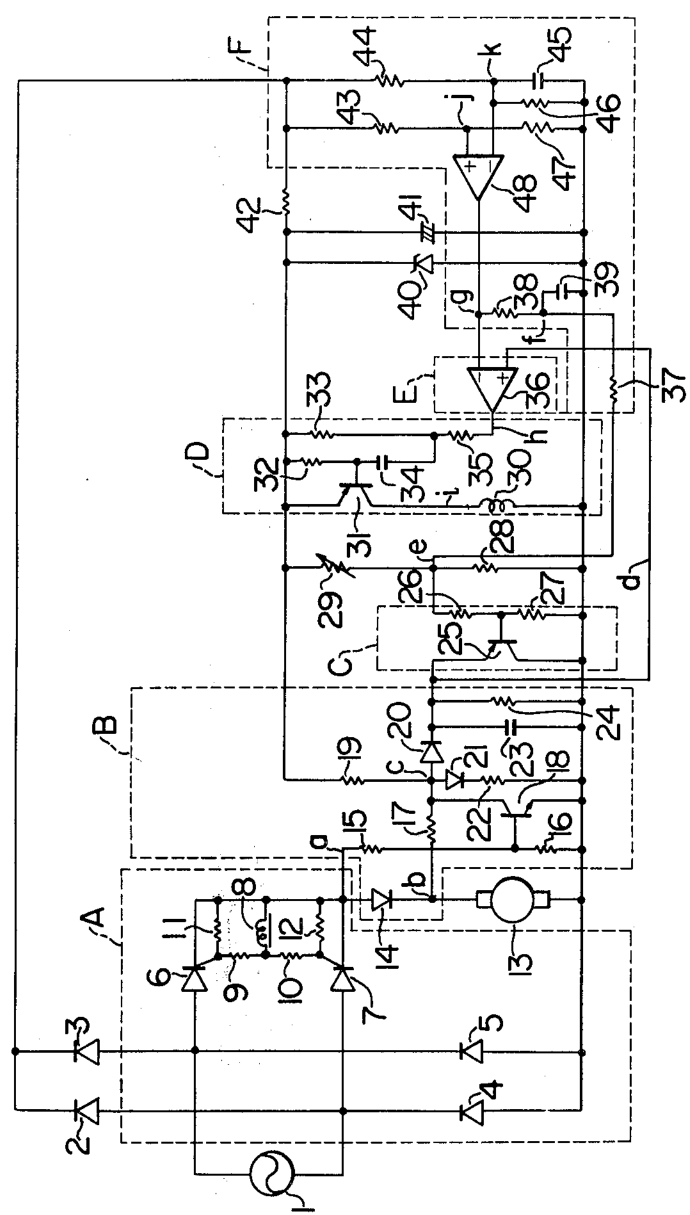
FIG. 1 shows a circuit diagram of a motor speed control system in accordance with one embodiment of the present invention.

FIG. 1 shows a circuit diagram of one embodiment of the motor speed control system of the present invention.

In FIG. 1, numeral 1 denotes an A.C. power supply, numerals 2 and 3 denote diodes for generating a control synchronizing signal. A block A is a conventional full-wave phase control circuit comprising thyristors 6 and 7 and diodes 4 and 5. It drives a D.C. motor 13. Numerals 9, 10, 11 and 12 denote resistors for dividing a trigger signal induced across a secondary coil 8 of a pulse transformer and imparting it to the thyristors 6 and 7.

A block B is an induced voltage detection circuit for the D.C. motor 13. It isolates a D.C. motor driving voltage waveform of the full-wave phase control circuit A, that is, the voltage at a point a in FIG. 1, from a voltage waveform at a point b which indicates the sum of the induced voltage of the D.C. motor and the D.C. motor driving voltage, by a diode 14, and extracts only the induced voltage at a point c by a transistor 18, and stores the extracted induced voltage or a detection signal in a capacitor 23 through a diode 20.

Numeral 17 denotes a resistor for imparting an appropriate voltage drop. Numerals 15 and 16 denote resistors for dividing a voltage during the ON period of the thyristors 6 and 7 for supplying it to the transistor 18. Numeral 21 denotes a temperature compensating diode for the diode 20, numerals 19 and 22 denote resistors for appropriately biasing the detected induced voltage to facilitate subsequent signal processing. Numeral 24 denotes a resistor for discharging the capacitor 23 and supplying an input biasing current to a comparator 36. It may have a large resistance in the order of several hundreds ohms.

A block C is a limiter circuit including a transistor 25 and resistors 26 and 27. It serves to prevent the charging voltage of the capacitor 23 from rising above a sum of a base potential of the transistor 25 and a base-emitter voltage $V_{BE}$ of the transistor 25 (approximately 0.6 volts). The base potential of the transistor 25 is determined by a potential at a point e, that is, a velocity reference voltage which is a D.C. voltage supply derived by dividing a power supply voltage for the control circuit by a potentiometer 29 and a resistor 28. The resistors 26 and 27 serve to divide the potential at the point e to adjust the limiter voltage for a desired operation.

Figure 2:
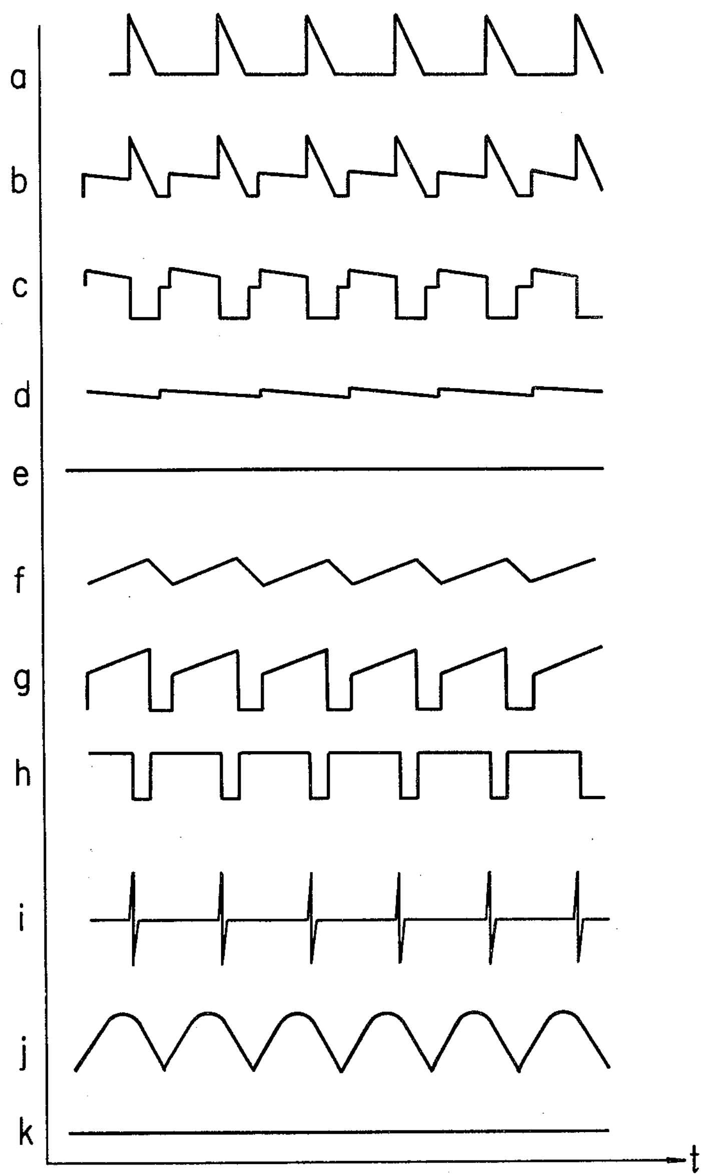
FIG. 2 shows operational waveforms in the circuit shown in FIG. 1.

FIG. 2 shows operational waveforms at the points a to k in the circuit of motor speed control system shown in FIG. 1.

Figure 3:
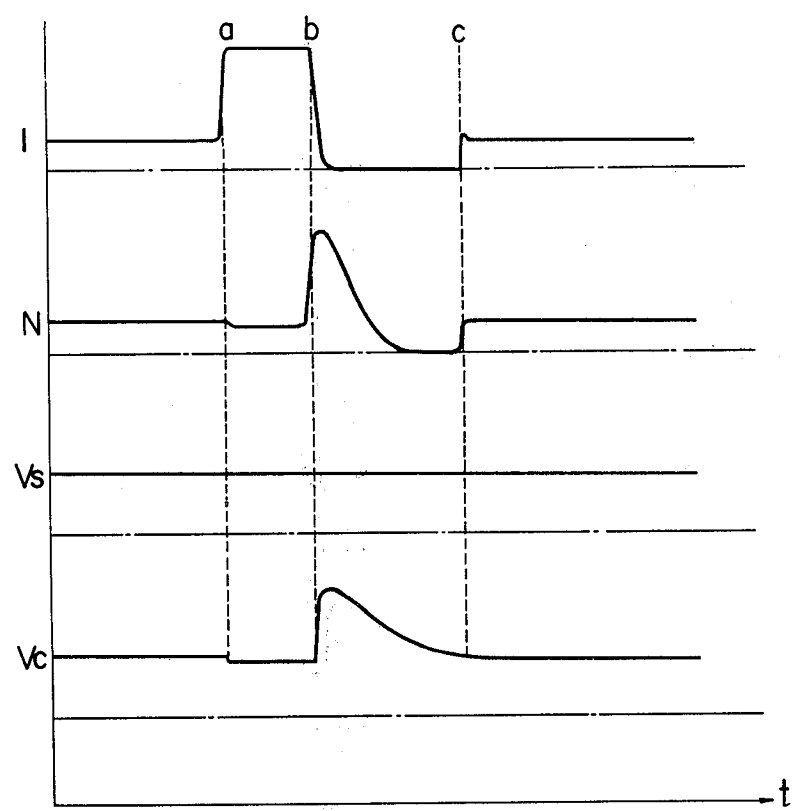
FIG. 3 shows operational waveforms for the circuit of FIG. 1 without a limiter circuit.

The difference between the presence of the limiter circuit C and the absence thereof is now explained with reference to FIGS. 3 and 4. FIG. 3 shows the waveforms when the limiter circuit C is absent and FIG. 4 shows the waveforms when the limiter circuit C is present.

Figure 4:
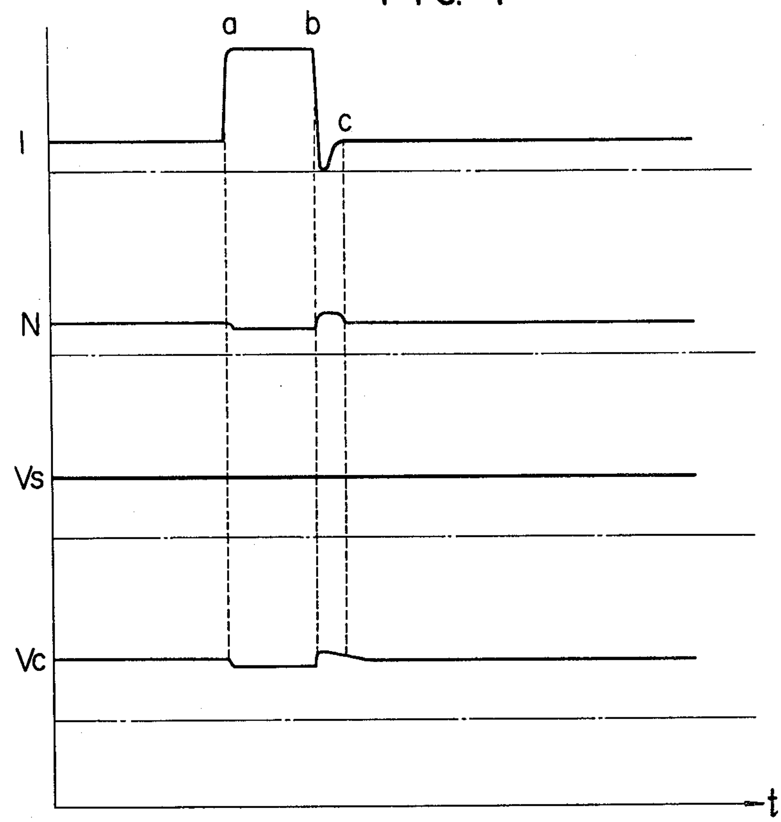
FIG. 4 shows operational waveforms for the circuit of FIG. 1 with the limiter circuit.

In FIGS. 3 and 4, I represents an operating current of the motor, N represents a rotation speed of the motor, $V_s$ represents a velocity reference voltage which corresponds to the potential at the point e in FIG. 1, and $V_c$ represents a detected induced voltage which corresponds to the potential at the point d in FIG. 1.

Referring to FIGS. 3 and 4, when a load of the motor suddenly changes from a heavy load to a light load, there is a big difference between the absence and presence of the limiter circuit C. In the case of absence of the limiter circuit C, the rotation speed transitionally varies substantially from a time point b at which the load is reduced to a time point c at which a desired rotation speed is recovered. In the case of presence of the limiter circuit C, the transient variation can be minimized. A direct cause therefor is that the signal is stored in the capacitor 23 in the induced voltage detection circuit B for the motor and hence the discharge time cannot be reduced for proper operation. As a result, a response time when the motor is accelerated significantly differs from that when the motor is decelerated, that is, the response in the deceleration is extremely worse than the response in the acceleration. For a motor load of a low velocity and widely varying load, such as that for a sewing machine motor, the response of the speed control should be as fast as possible. In such a case, the limiter circuit C may be added. In this manner the range of applicability of the motor speed control circuit of the present invention is expanded. The limiter circuit, however, may be omitted depending on a particular type of load.

A block D shown in FIG. 1 is a pulse generator circuit for triggering the thyristors 6 and 7 of the full-wave phase control circuit A. Numeral 30 denotes a primary winding of a pulse transformer and the numeral 8 in the full-wave phase control circuit A denotes the secondary winding of the pulse transformer. Numeral 31 denotes a transistor for driving the primary winding 30 of the pulse transformer and differentiates an output of a comparator 36 by a capacitor 34 and resistors 32, 33 and 35 to produce a pulsive base current.

A block F is a sawtooth wave generating circuit in which a full-wave rectified waveform from the diodes 2, 3, 4 and 5 is fed to a bridge circuit comprising resistors 43, 44, 46 and 47. A full-wave rectified power supply voltage and a smoothed voltage thereof by a capacitor 45 are applied to a comparator 48 to produce an ON-OFF output of a fixed ON/OFF output ratio, synchronized with the power supply frequency. The velocity reference voltage which is the D.C. voltage at the point e is charged into the capacitor 39 through the resistor 37 and it is discharged through the resistor 38 by the ON-OFF output signal from the comparator 36 so that the sawtooth wave synchronized with the power supply frequency is produced.

The sawtooth wave has dual functions of the velocity reference and the synchronization.

Figure 5:
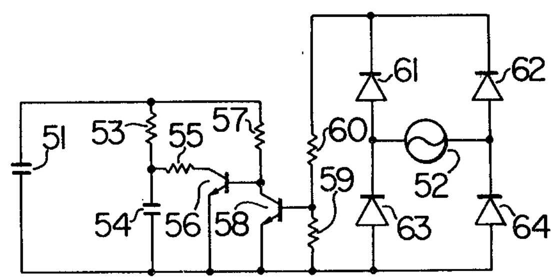
FIG. 5 shows a conventional sawtooth wave generator circuit used in the circuit of FIG. 1.

FIG. 5 shows a conventional sawtooth wave generator circuit which employs transistors. In FIG. 5, a base-emitter voltage $V_{BE}$ (approximately 0.6 volts) of a transistor 58 is used as a reference voltage. As a result, the ON/OFF ratio of the output of the transistor 56 varies with the changes of temperature and power supply voltage. Accordingly, it is not appropriate for the motor speed control circuit of the present invention in which the sawtooth wave itself is used as the velocity reference voltage.

In FIG. 5, numeral 51 denotes a D.C. power supply, numeral 52 denotes an A.C. power supply, numerals 53, 55, 57, 59 and 60 denote resistors, numeral 54 denotes a capacitor and numerals 61, 62, 63 and 64 denote diodes which form a full-wave rectifying circuit. Detailed description of the operation is omitted here.

On the contrary, the sawtooth wave generator circuit F of the present invention uses the power supply voltage as the reference voltage and provides a fixed ON/OFF ratio output to the comparator independently of the changes in the power supply voltage and frequency, by the use of the bridge circuit. Accordingly, the constant sawtooth wave can be produced.

A block E comprises the comparator 36 which compares the detection signal from the induced voltage detection circuit B with the sawtooth wave signal from the sawtooth wave generator circuit F, having the functions of voltage reference and the synchronization. The pulse generator circuit D produces a trigger pulse to trigger the thyristors in the full-wave phase control circuit A.

In FIG. 1, numeral 40 denotes a zener diode, numeral 41 denotes a capacitor and numeral 42 denotes a resistor.

The present invention thus constructed has the following advantages:

(1) The operation noise of the motor is small because of the driving power supply using the full-wave phase control circuit.

(2) Variation of speed of the motor due to the changes in the power supply voltage and frequency is small.

(3) Because of fast response speed, it is particularly advantageous for the motor speed control of the sewing machine.

(4) The overall construction is relatively simple.

What is claimed is:

1. A motor speed control system comprising:

a motor adapted to be driven by a full-wave rectified phase controlled power supply;

a control circuit including a thyristor for controlling the energization of said motor;

a sawtooth wave generator circuit for generating a sawtooth wave by charging and discharging a first capacitor with a D.C. power supply voltage used as a velocity reference voltage, in synchronism with a power supply frequency;

an induced voltage detection circuit for detecting an induced voltage due to the rotation of said motor and storing said induced voltage on a second capacitor;

a limiter circuit for limiting the charge voltage on said second capacitor, said limiter circuit providing a limiting voltage varying with said D.C. power supply voltage;

a compare circuit for comparing the sawtooth wave from said sawtooth wave generator circuit with the voltage on said second capacitor from said induced voltage detection circuit; and a pulse generator circuit responsive to the output signal from said compare circuit to generate a pulse for triggering said thyristor.

2. A motor speed control system according to claim 1 wherein said sawtooth wave generator circuit includes a comparator adapter to receive a full-wave rectified power supply voltage and a smoothened full-wave rectified power supply voltage through a bridge circuit, said first capacitor being charged through a first resistor by said D.C. power supply for establishing said velocity reference voltage and discharged through a second resistor, and wherein charging and discharging of said first capacitor is controlled by an ON-OFF output from said comparator.

3. A motor speed control system according to claim 1 wherein said limiter circuit includes a current absorbing transistor having a collector and an emitter connected across said second capacitor of said induced voltage detection circuit, said collector being grounded, and a base potential of said transistor being controlled by said velocity reference voltage.

* * * * *